(12) United States Patent
Chung

(10) Patent No.: US 9,781,790 B2
(45) Date of Patent: Oct. 3, 2017

(54) PHASE SHIFT CIRCUIT AND DIMMING CIRCUIT INCLUDING THE SAME

(75) Inventor: Youn-woong Chung, Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 1046 days.

(21) Appl. No.: 13/234,656

(22) Filed: Sep. 16, 2011

(65) Prior Publication Data

US 2012/0091905 A1 Apr. 19, 2012

(30) Foreign Application Priority Data

Oct. 18, 2010 (KR) ........................ 10-2010-0101471

(51) Int. Cl.
*H05B 37/02* (2006.01)
*H05B 33/08* (2006.01)

(52) U.S. Cl.
CPC ........ *H05B 33/0818* (2013.01); *Y02B 20/346* (2013.01)

(58) Field of Classification Search
CPC ........ H03L 7/00; H03K 3/017; H03K 5/1565; H03K 5/15; H03K 5/15066; G06F 1/10; G11C 7/222; H05B 41/3927; H05B 33/0818; H05B 41/2822; H05B 41/3924; H05B 33/0815; H05B 33/0824; H05B 33/0827; H05B 33/0851; H05B 37/02; H05B 41/2828; G09G 3/3406; G09G 3/342; H02J 1/14; H02M 1/36

USPC ....... 327/135, 144, 151, 153, 160, 161, 175, 327/172, 231, 324; 315/186, 247, 291, 315/307
See application file for complete search history.

(56) References Cited

U.S. PATENT DOCUMENTS

| 5,099,202 A | * | 3/1992 | Claydon et al. ............. 327/239 |
| 6,501,234 B2 | * | 12/2002 | Lin et al. ...................... 315/307 |
| 6,930,898 B2 | | 8/2005 | Jeon et al. |
| 7,605,545 B2 | * | 10/2009 | Bai .................... H05B 41/2828 315/247 |
| 8,258,714 B2 | * | 9/2012 | Liu .............................. 315/250 |
| 8,400,082 B2 | | 3/2013 | Lee |
| 8,502,481 B2 | * | 8/2013 | Hagino ................. G09G 3/342 315/169.2 |
| 8,648,545 B2 | | 2/2014 | Lee et al. |
| 2009/0225020 A1 | * | 9/2009 | Ran ...................... G09G 3/3406 345/102 |

(Continued)

FOREIGN PATENT DOCUMENTS

| JP | 11-297485 | 10/1999 |
| KR | 10-0616538 | 8/2006 |

(Continued)

*Primary Examiner* — Alexander H Taningco
*Assistant Examiner* — Seokjin Kim
(74) *Attorney, Agent, or Firm* — Okamoto & Benedicto LLP

(57) ABSTRACT

A phase shift circuit includes an on signal generator, an off signal generator, and a channel signal generator. The on signal generator generates an on signal having a rising edge shifted by a predetermined phase based on a pulse width modulation (PWM) signal, the off signal generator generates an off signal based on the PWM signal and the on signal, and the channel signal generator generates a channel signal that is enabled in response to the rising edge of the on signal and disabled in response to a rising edge of the off signal.

19 Claims, 8 Drawing Sheets

(56) References Cited

U.S. PATENT DOCUMENTS

| | | | |
|---|---|---|---|
| 2009/0261747 A1 | 10/2009 | Bai et al. | |
| 2010/0301764 A1* | 12/2010 | Liu | 315/250 |
| 2011/0109238 A1* | 5/2011 | Tang et al. | 315/250 |
| 2011/0163785 A1* | 7/2011 | Chen et al. | 327/144 |
| 2012/0038404 A1* | 2/2012 | Yong | 327/175 |
| 2012/0112811 A1* | 5/2012 | Cook | 327/175 |

FOREIGN PATENT DOCUMENTS

| | | |
|---|---|---|
| KR | 10-0941509 | 2/2010 |
| KR | 10-0971757 | 7/2010 |

\* cited by examiner

PHASE SHIFT CIRCUIT AND DIMMING CIRCUIT INCLUDING THE SAME

CROSS-REFERENCE TO RELATED APPLICATION

This application claims the benefit of Korean Patent Application No. 10-2010-0101471, filed on Oct. 18, 2010, in the Korean Intellectual Property Office, the disclosure of which is incorporated herein in its entirety by reference.

BACKGROUND

The inventive concept relates to a phase shift circuit, and more particularly, to a phase shift circuit for receiving a pulse width modulation (PWM) signal and providing the signal having a shifted phase, and a dimming circuit including the phase shift circuit.

Phase shift circuits provide an input signal having a phase shifted by a predetermined or externally set phase. The phase shift circuit may be implemented using digital or analog circuit elements.

When brightness of a light emitting diode (LED) device is controlled, a PWM signal may be provided to a plurality of LED strings as a driving signal. When the plurality of LED strings are all activated, voltage of the driving signal may not be uniformly maintained and thus stability thereof may not be secured.

SUMMARY

The inventive concept provides a phase shift circuit which may provide a plurality of phase shift signals having phases that are different from each other based on a single pulse width modulation (PWM) signal.

The inventive concept also provides a dimming circuit which may provide a plurality of phase shift signals having phases that are different from each other based on a PWM signal to each of a plurality of light emitting diode (LED) strings and thereby, perform a stable dimming operation.

According to an aspect of the inventive concept, there is provided a phase shift circuit including an on signal generator, an off signal generator, and a channel signal generator. The on signal generator generates an on signal having a rising edge shifted by a predetermined phase based on a pulse width modulation (PWM) signal. The off signal generator generates an off signal based on the PWM signal and the on signal. The channel signal generator generates a channel signal that is enabled in response to the rising edge of the on signal and disabled in response to a rising edge of the off signal.

The on signal generator may include: a first ramp signal generator for generating a ramp signal that linearly increases in each period of the PWM signal in response to the PWM signal; a peak signal generator for generating a peak signal that maintains a peak value of the ramp signal based on the ramp signal; a voltage divider for providing a divided peak signal by dividing the peak signal by a predetermined ratio; and a first comparator for generating the on signal by comparing the divided peak signal with the ramp signal.

The first ramp signal generator may include: a first ramp signal unit for generating a first ramp signal that linearly increases during an odd-numbered period of the PWM signal in response to the PWM signal; a second ramp signal unit for generating a second ramp signal that linearly increases during an even-numbered period of the PWM signal in response to the PWM signal; and a summer for providing the ramp signal by summing up the first ramp signal and the second ramp signal.

The first ramp signal unit may include: a first flip flop for providing a transformed PWM signal that is toggled in each period of the PWM signal; and a first capacitor, to which electric charges are charged based on the transformed PWM signal, wherein the first ramp signal unit provides a voltage between both terminals of the first capacitor as the first ramp signal.

The first ramp signal unit may further include a discharge transistor that discharges electric charges charged to the first capacitor in response to a complementary transformed PWM signal, which is an inverse signal of the transformed PWM signal.

The first ramp signal unit may further include: a first amplifier comprising a non inverting terminal, to which the transformed PWM signal is input, and an inverting terminal connected to a first node; and a first resistor connected between the first node and a ground voltage, wherein a current that corresponds to a current flowing in the first resistor is charged to the first capacitor.

The peak signal generator may include: a third capacitor, to which electric charges are charged based on the transformed PWM signal; and a first transistor connected to the third capacitor in series that allows electric charges to be charged in the third capacitor in response to a peak enable signal, which samples an initial period of the transformed PWM signal, wherein the peak signal generator provides a voltage of both terminals of the third capacitor as the peak signal.

The third capacitor of the peak signal generator may be charged by a current that corresponds to the current flowing in the first resistor.

The off signal generator may include: a duty signal generator for generating a duty peak signal having a value that is in proportion to a duty ratio of the PWM signal; a second ramp signal generator for generating an on ramp signal based on the on signal; and a second comparator for generating the off signal by comparing the on ramp signal with the duty peak signal.

The duty signal generator may include: a duty ramp signal generator for generating a duty ramp signal that linearly increases while the PWM signal is in a logic 'high' state; and a duty peak signal generator for generating the duty peak signal that maintains a peak value of the duty ramp signal based on the duty ramp signal.

The channel signal generator may include a channel capacitor that is charged in response to the on signal and discharged in response to the off signal, and provides a voltage of both terminals of the channel capacitor as the channel signal.

According to another aspect of the inventive concept, there is provided a phase shift circuit including: an on signal generator for generating an on signal having a rising edge shifted by a selected phase based on a pulse width modulation (PWM) signal; an off signal generator for generating an off signal based on the PWM signal and the on signal; and a channel signal generator for generating a channel signal that is enabled in response to the rising edge of the on signal and disabled in response to a rising edge of the off signal.

The on signal generator may include: a ramp signal generator for generating a ramp signal that linearly increases during a period of the PWM signal in response to the PWM signal; a peak signal generator for generating a peak signal that maintains a peak value of the ramp signal based on the ramp signal; a voltage divider for providing at least one divided peak signal by dividing the peak signal based on a phase selection signal for selecting the phase; and a comparator for generating the at least one on signal by comparing the at least one divided peak signal with the ramp signal.

The on signal generator may further include a controller that generates the phase selection signal.

The voltage divider may include: a plurality of division resistors connected in series between a node, to which the peak signal is applied, and a ground voltage; and at least one switch comprising one end connected to at least one node between the plurality of division resistors and the other end for providing the divided peak signal, when the at least one switch is turned on in response to the phase selection signal.

A ratio of the divided peak signal to the peak signal may be in proportion to the selected phase.

According to another aspect of the inventive concept, there is provided a dimming circuit including: a phase shift circuit for providing a plurality of channel signals having phases different from each other based on a pulse width modulation (PWM) signal; a gate control integrated circuit (IC) electrically connected to the phase shift circuit, for generating a gate control signal; a driver for providing an input voltage in response to the gate control signal; and a plurality of light emitting diode (LED) strings driven based on the input voltage and the plurality of channel signals.

The driver may include: a gate transistor for grounding the input voltage in response to the gate control signal; and a capacitor for planarizing the input voltage and providing the planarized input voltage to one end of the plurality of LED strings.

The phase shift circuit may include: an on signal generator for generating a plurality of on signals having rising edges shifted by the phases that are different from each other based on the PWM signal; an off signal generator for generating a plurality of off signals having rising edges after pulse duration of the PWM signal is elapsed from a point of time when the corresponding on signals have the rising edges, based on the PWM signal and the corresponding on signals; and a channel signal generator for generating a plurality of channel signals that are each enabled in response to the rising edges of the corresponding on signals and disabled in response to the rising edges of the corresponding off signals.

Each of the plurality of LED strings may include a switch that is turned on in response to the channel signal.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
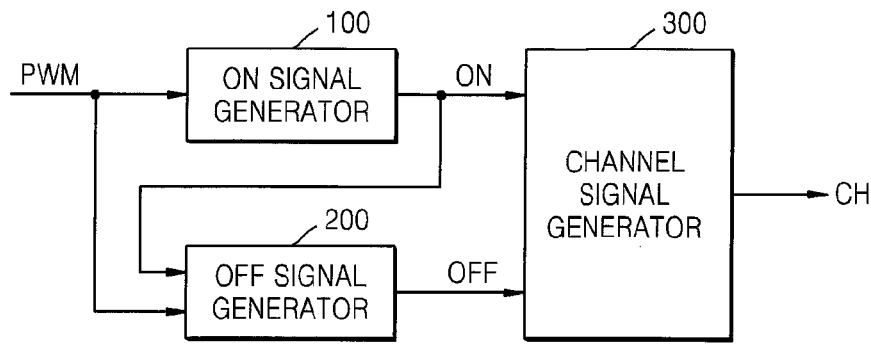
FIG. 1 is a block diagram of a phase shift circuit, according to an embodiment of the inventive concept.

Specific structural and functional details disclosed herein are merely representative for purposes of describing exemplary embodiments. This invention may, however, may be embodied in many alternate forms and should not be construed as limited to only the exemplary embodiments set forth herein.

The inventive concept may be embodied in many different forms and the embodiments of the inventive concept will be described in detail with reference to the accompanying drawings. It should be understood, however, that there is no intent to limit exemplary embodiments to the particular forms disclosed, but on the contrary, exemplary embodiments are to cover all modifications, equivalents, and alternatives falling within the scope of the invention.

It will be understood that, although the terms first, second, third, etc., may be used herein to describe various elements, these elements should not be limited by these terms. These terms are only used to distinguish one element from another element. For example, a first element discussed below could be termed a second element and similarly, a second element could be termed a first element without departing from the teachings of exemplary embodiments.

It will be understood that when an element is referred to as being connected to" or "contact" another element, it can be directly or indirectly connected to or contact the other element. That is, for exemplary, intervening elements may be present. In contrast, when an element is referred to as being "directly connected to" or "directly contacting" another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of exemplary embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless defined differently, all terms used in the description including technical and scientific terms have the same meaning as generally understood by those of ordinary skill in the art. Terms as defined in a commonly used dictionary should be construed as having the same meaning as in an associated technical context, and unless defined apparently in the description, the terms are not ideally or excessively construed as having formal meaning.

Hereinafter, the embodiments of the inventive concept will be described in detail with reference to the accompanying drawings. In the drawings, like reference numerals denote like references. Thus, detailed descriptions will not be repeated.

FIG. 1 is a block diagram of a phase shift circuit 10, according to an embodiment of the inventive concept.

Referring to FIG. 1, the phase shift circuit 10 may include an on signal generator 100, an off signal generator 200, and a channel signal generator 300.

The on signal generator 100 generates an on signal ON based on a pulse width modulation (PWM) signal.

The PWM signal is a signal having a regular period. The PWM signal may be a signal enabled at a starting point of the period and disabled after predetermined time. Here, the time ratio enabled in one period is duty ratio. Also, time that the PWM signal is enabled in one period is referred to as pulse duration. An enabled state in the specification may correspond to a logic 'high' state and a disabled state may correspond to a logic 'low' state; however, this may be the other way around.

The on signal ON may be a signal having a phase shifted by a predetermined phase in correspondence to a period of the PWM signal. That is, the on signal ON may be a signal having a rising edge at the point delayed by predetermined time compared with the PWM signal. When one period of the PWM signal is completed, the on signal ON may be initialized to be in a disabled state and thus may have a falling edge.

The off signal generator 200 provides an off signal OFF based on the PWM signal and the on signal ON. The off signal OFF may be generated by comparing a duty peak (DP) signal of FIG. 3 that corresponds to a pulse width of the PWM signal with the on signal ON.

The channel signal generator 300 may generate a channel signal CH which is enabled in response to the rising edge of the on signal ON and is disabled in response to a rising edge of the off signal OFF. When a light emitting diode (LED) receives the channel signal CH, the LED may be turned on in response to the on signal ON and turned off in response to the off signal OFF.

The channel signal CH may be a signal which is shifted from a PWM signal by a predetermined phase, that is, a signal which is delayed from the PWM signal by predetermined time. Accordingly, a waveform of the channel signal CH may be substantially the same as the PWM signal except for its phase.

The phase shift circuit 10 according to the current embodiment of the inventive concept may provide the channel signals CH having phases that are different from each other based on the PWM signal. Here, the phase shift circuit 10 may be simply realized without receiving a separate off signal or a ramp signal provided from the outside.

Also, as will be described later, the phase shift circuit 10 receives only one PWM signal and may provide a plurality of channel signals CH having phases that are different from each other. The phase shift circuit 10 that provides three channel signals CH is described below; however, the inventive concept is not limited thereto. It would have been obvious to one of ordinary skill in the art that the number of the channel signals CH may vary at need.

Figure 2:
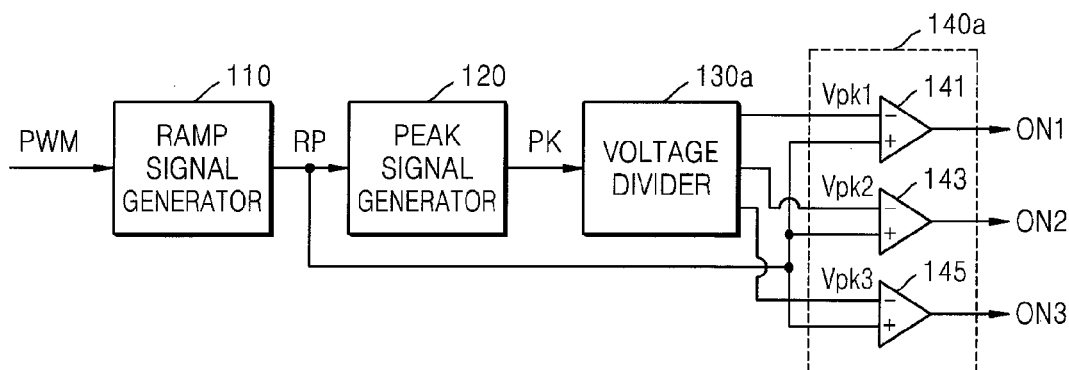
FIG. 2 is a block diagram of an on signal generator, according to an embodiment of the inventive concept.

FIG. 2 is a block diagram of an on signal generator 100a, according to an embodiment of the inventive concept.

Referring to FIG. 2, the on signal generator 100a may include a ramp signal generator 110, a peak signal generator 120, a voltage divider 130a, and a comparator 140a.

The ramp signal generator 110 may generate a ramp signal RP. The ramp signal RP may have a waveform that linearly increases each period of the PWM signal in correspondence to the PWM signal. That is, the ramp signal RP may be a periodic signal having a waveform such as a sawtooth waveform, and a period of the ramp signal RP may be the same as the period of the PWM signal. The ramp signal RP may be provided to the peak signal generator 120 and the comparator 140a.

The peak signal generator 120 may generate a peak signal PK. The peak signal PK may be a signal that maintains a peak value of the ramp signal RP.

The voltage divider 130a receives the peak signal PK and divides a voltage level of the received peak signal PK by a predetermined ratio, thereby providing at least one divided peak signal that is in proportion to the peak signal PK. In the current embodiment of the inventive concept, the voltage divider 130a may provide first through third divided peak signals Vpk1, Vpk2, and Vpk3. However, the inventive concept is not limited to the above number of the divided peak signals.

The peak signal PK has a specific voltage level, and each of the divided peak signals Vpk1, Vpk2, and Vpk3 may have a voltage level that is in proportion to the voltage level of the peak signal PK. A ratio of the divided peak signals Vpk1, Vpk2, and Vpk3 to the peak signal PK may be predetermined or may be set during an operation. For example, the first divided peak signal Vpk1, the second divided peak signal Vpk2, and the third divided peak signal Vpk3 may be ¼ times, ½ times, and ¾ times the peak signal PK, respectively.

The voltage divider 130a may include a plurality of resistors or transistors. In FIG. 2, the first through third divided peak signals Vpk1, Vpk2, and Vpk3 are provided through the voltage divider 130a. However, the inventive concept is not limited thereto.

The comparator 140a may receive the at least one divided peak signal and the ramp signal RP and compares the divided peak signal with the ramp signal RP, thereby generating an on signal ON. In the current embodiment of the inventive concept, the comparator 140a may receive the first through third divided peak signals Vpk1, Vpk2, and Vpk3, compare each of the first through third divided peak signals Vpk1, Vpk2, and Vpk3 with the ramp signal RP, and generate first through third on signals ON1, ON2, and ON3.

For example, when the ramp signal RP is smaller than the first divided peak signal Vpk1, the first on signal ON1 is in an disabled state that corresponds to a logic 'low' state, and when the ramp signal RP is greater than the first divided peak signal Vpk1, the first on signal ON1 is in an enabled state that corresponds to a logic 'high' state. Accordingly, when the ramp signal RP 1 is greater than the first divided peak signal Vpk1, the first on signal ON1 may have a rising edge.

Accordingly, a point of time when the first on signal ON1 has a rising edge may be determined by the voltage level of the first divided peak signal Vpk1. For example, when it is determined that the first divided peak signal Vpk1 is ¼ times the peak signal PK, the point of time when the first on signal ON1 has a rising edge may be elapsed by ¼ times of the period of the PWM signal from the starting point of the period of the PWM signal.

The second and third on signals ON2 and ON3 may be generated in a similar manner to that of the first on signal ON1. For example, when it is determined that the second divided peak signal Vpk2 is ½ times the peak signal PK, the point of time when the second on signal ON2 has a rising edge may be elapsed by ½ times of the period of the PWM signal from the starting point of the period of the PWM signal. Also, when it is determined that the third divided peak signal Vpk3 is ¾ times the peak signal PK, the point of time when the third on signal ON3 has a rising edge may be elapsed by ¾ times of the period of the PWM signal from the starting point of the period of the PWM signal.

Here, the starting points of the periods of the first through third on signals ON1, ON2, and ON3 may be defined by the rising edges of the first through third on signals ON1, ON2, and ON3. That is, the periods of the first through third on signals ON1, ON2, and ON3 may be disposed from the rising edges of the first through third on signals ON1, ON2, and ON3 to the next rising edges. Accordingly, the periods of the first through third on signals ON1, ON2, and ON3 may be differently disposed on a time base. The periods of the first through third on signals ON1, ON2, and ON3 may be delayed by predetermined time on a time base.

As described above, the comparator 140a receives the first through third divided peak signals Vpk1, Vpk2, and Vpk3 provided by the voltage divider 130a and the ramp signal RP provided by the ramp signal generator 110 and thus generates the first through third on signals ON1, ON2 and ON3. However, the inventive concept is not limited thereto.

Figure 3:
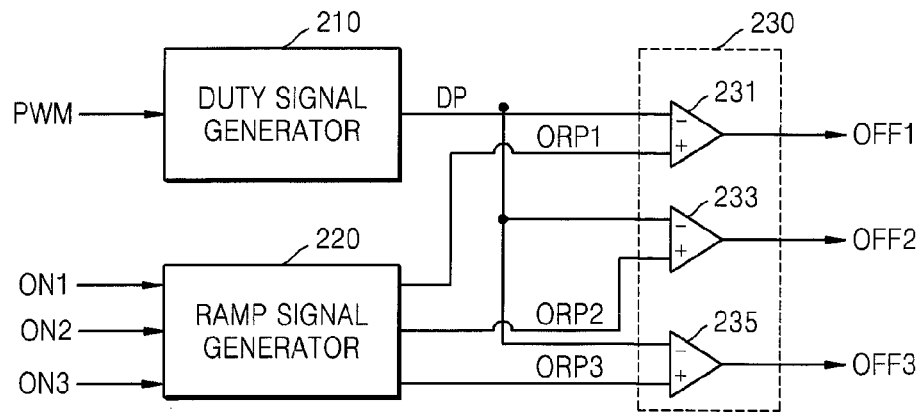
FIG. 3 is a block diagram of an off signal generator, according to an embodiment of the inventive concept.

FIG. 3 is a block diagram of the off signal generator 200, according to an embodiment of the inventive concept.

Referring to FIG. 3, the off signal generator 200 may include a duty signal generator 210, a ramp signal generator 220, and a comparator 230.

Figure 4:
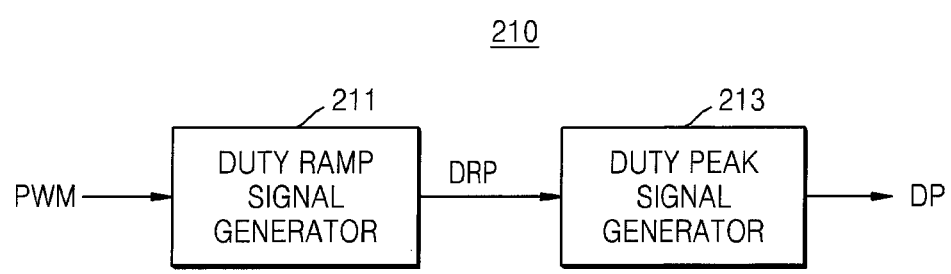
FIG. 4 is a block diagram of a duty signal generator, according to an embodiment of the inventive concept.

The duty signal generator 210 may generate a duty ramp signal DRP of FIG. 4 based on the PWM signal and again generate a duty peak signal DP based on the duty ramp signal DRP.

The duty ramp signal DRP may be a signal having a waveform that linearly increases during time that the PWM signal is in a logic 'high' state in correspondence to the PWM signal, that is, during pulse duration, and having a voltage waveform of a ground voltage during time that the PWM signal is in a logic 'low' state. The duty peak signal DP may be a signal that is in proportion to a duty ratio of the PWM signal. That is, as the duty ratio of the PWM signal increases, a voltage level of the duty peak signal DP may increase.

The ramp signal generator 220 may generate at least one on ramp signal based on the on signal ON. In the current embodiment of the inventive concept, the ramp signal generator 220 may receive first through third on signals ON1, ON2, and ON3 and generate first through third on ramp signals ORP1, ORP2, and ORP3. The number of the first through third on ramp signals ORP1, ORP2, and ORP3 may be the same as the number of the first through third on signals ON1, ON2, and ON3. However, the inventive concept is not limited thereto.

The first through third on ramp signals ORP1, ORP2, and ORP3 may be signals that linearly increase each period of the corresponding first through third on signals ON1, ON2, and ON3. The first through third on ramp signals ORP1, ORP2, and ORP3 may have periodic functions having the periods that are same as the periods of the corresponding first through third on signals ON1, ON2, and ON3 and may have a waveform that linearly increases each period. That is, the first through third on ramp signals ORP1, ORP2, and ORP3 may have a waveform such as a sawtooth waveform. Accordingly, the periods of the first through third on ramp signals ORP1, ORP2, and ORP3 may be delayed by predetermined time on a time base.

The ramp signal generator 220 of FIG. 3 may have the same structure as the ramp signal generator 110 of FIG. 2. However, the ramp signal generator 220 and the ramp signal generator 110 is different from each other in that the ramp signal generator 220 receives the first through third on signals ON1, ON2, and ON3, whereas the ramp signal generator 110 receives the PWM signal. Accordingly, the first through third on ramp signals ORP1, ORP2, and ORP3 may each correspond to the ramp signal RP having a phase shifted by a predetermined phase. For example, the first on ramp signal ORP1 may be a signal that the ramp signal RP is shifted by $\pi/2$, the second on ramp signal ORP2 may be a signal that the ramp signal RP is shifted by $\pi$, and the third on ramp signal ORP3 may be a signal that the ramp signal RP is shifted by $3\pi/2$.

The comparator 230 may compare the duty peak signal DP with the on ramp signal and provide at least one off signal OFF. In the current embodiment of the inventive concept, the comparator 230 may compare the duty peak signal DP with the first through third on ramp signals ORP1, ORP2, and ORP3 and thereby, provide first through third off signals OFF1, OFF2, and OFF3. However, the number of the off signals OFF1, OFF2, and OFF3 is not limited thereto.

The first through third off signals OFF1, OFF2, and OFF3 may have rising edges at the time when pulse duration of the PWM signal is elapsed from the rising edges of the corresponding on signals ON1, ON2, and ON3.

FIG. 4 is a block diagram of the duty signal generator 210, according to an embodiment of the inventive concept.

Referring to FIG. 4, the duty signal generator 210 may include a duty ramp signal generator 211 and a duty peak signal generator 213.

The duty ramp signal generator 211 may generate a duty ramp signal DRP based on the PWM signal. The duty ramp signal DRP may have a voltage level that linearly increases during pulse duration of the PWM signal and may have a voltage level of a ground voltage while the PWM signal is in a disabled state. The duty ramp signal generator 211 may partially have a similar structure to the ramp signal generator 110 of FIG. 1.

The duty peak signal generator 213 may generate a duty peak signal DP based on the duty ramp signal DRP. The duty peak signal DP may be a signal that linearly increases during a part of an initial period of the duty ramp signal DRP and that maintains a peak value after the duty ramp signal DRP reaches the peak value. The duty peak signal generator 213 may substantially have the same structure as the peak signal generator 120 of FIG. 1.

Figure 5:
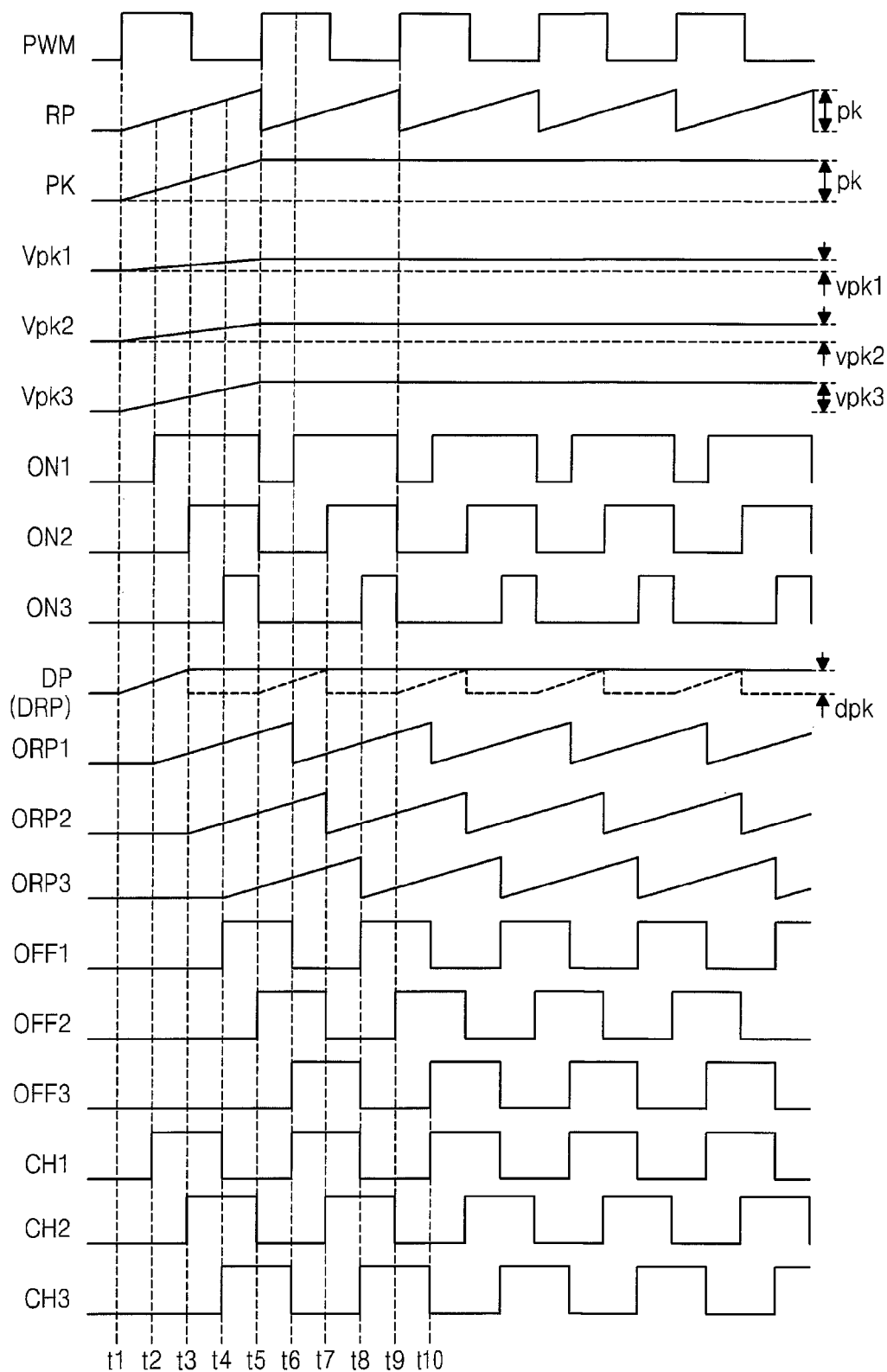
FIG. 5 shows waveforms for illustrating an operation of a phase shift circuit, according to an embodiment of the inventive concept.

FIG. 5 shows waveforms for illustrating an operation of the phase shift circuit 10, according to an embodiment of the inventive concept.

The operation of the phase shift circuit 10 according to the current embodiment of the inventive concept will be described with reference to FIGS. 1 through 5.

In each waveform, the form of each signal may correspond to a voltage level. In the specification, a signal level and a voltage level may be substantially the same.

The PWM signal transits from a logic 'low' state to a logic 'high' state at t1 and transits from a logic 'high' state to a logic 'low' state at t3. The PWM signal has a period from t1 to t5 and has pulse duration from t1 to t3. In FIG. 5, the PWM signal has a fixed duty ratio from t1 to t3. However, the inventive concept is not limited thereto, and the duty ratio of the PWM signal may vary according to time. When the phase shift circuit 10 is applied to a dimming circuit, which will be described later, brightness of light emitting diodes (LED) may be controlled based on the duty ratio of the PWM signal.

For clear understanding of the inventive concept, it is assumed that the PWM signal uniformly has a duty ratio of 50%. Also, it is assumed that t1 through t10 have regular time intervals.

The ramp signal RP that linearly increases from t1 to t5 is generated based on the PWM signal. The ramp signal RP has a falling edge since the ramp signal RP is initialized at t5. Then, the ramp signal RP linearly increases from t5 to t9 and repeatedly has a falling edge at t9. The ramp signal RP is a periodic signal having a period that is same as that of the PWM signal. The ramp signal RP has a peak value pk at t5 and t9. The peak value pk of the ramp signal RP may be in proportion to the period of the PWM signal.

The peak signal PK maintains the peak value pk of the ramp signal RP. The peak signal PK linearly increases from t1 to t5; however, has the peak value pk after t5. The peak value pk of the peak signal PK may be in proportion to the period of the PWM signal.

The first through third divided peak signals Vpk1, Vpk2, and Vpk3 are ¼ times, ²⁄₄ times, and ¾ times the peak signal PK, respectively. Similar to the peak signal PK, the first through third divided peak signals Vpk1, Vpk2, and Vpk3 linearly increase from t1 to t5; however, have regular voltage level values vpk1, vpk2, vpk3, respectively, after t5. For clear understanding of the inventive concept, it is assumed that the first through third divided peak signals Vpk1, Vpk2, and Vpk3 have uniform regular voltage level values vpk1, vpk2, vpk3, respectively, at all times.

The ramp signal RP is compared with the voltage level value vpk1 of the first divided peak signal Vpk1. When the ramp signal RP is greater than the voltage level value vpk1 of the first divided peak signal Vpk1, the first on signal ON1 has a value corresponding to a logic 'high' state. Accordingly, the first on signal ON1 may have a rising edge at t2. Similarly, the first on signal ON1 may have a rising edge at t6. t2, which is a point of time that the first on signal ON1 has a rising edge, is a point of time shifted from t1, which is a point of time that the PWM signal has a rising edge, by π/2.

The ramp signal RP is compared with the voltage level value vpk2 of the second divided peak signal Vpk2. When the ramp signal RP is greater than the voltage level value vpk2 of the second divided peak signal Vpk2, the second on signal ON2 has a value corresponding to a logic 'high' state. Since the voltage level value vpk2 of the second divided peak signal Vpk2 is greater than the voltage level value vpk1 of the first divided peak signal Vpk1, the second on signal ON2 may have a rising edge at t3, which is delayed compared with the first on signal ON1. t3 is a point of time shifted from t1, which is a point of time that the PWM signal has a rising edge, by π.

The ramp signal RP is compared with the voltage level value vpk3 of the third divided peak signal Vpk3. When the ramp signal RP is greater than the voltage level value vpk3 of the third divided peak signal Vpk3, the third on signal ON3 has a rising edge at t4. t4 is a point of time shifted from t1, which is a point of time that the PWM signal has a rising edge, by 3π/4.

Accordingly, the first through third on signals ON1, ON2, and ON3 may each have a rising edge at a point of time where phases are shifted in proportion to ratio of the first through third divided peak signals Vpk1, Vpk2, Vpk3 to each peak signal PK. Since the ramp signal RP is initialized each time when each period of the PWM signal is completed, the first through third on signals ON1, ON2, and ON3 are also initialized each time when each period of the PWM signal is completed and thus have falling edges.

The duty signal generator 210 generates a duty ramp signal DRP (represented by a dotted line) that linearly increases while the PWM signal is in a logic 'high' state and generates a duty peak signal. DP that maintains the maximum value dpk of the duty ramp signal DRP. In FIG. 5, the PWM signal has a duty ratio of ½ and thus the maximum value dpk of the duty peak signal DP may be ½ of the peak value pk of the peak signal PK. The maximum value dpk of the duty peak signal DP may be in proportion to a duty ratio of the PWM signal. However, when the duty ratio of the PWM signal is changed, the duty signal generator 210 may be refreshed each time when the duty ratio is changed. The refreshed duty signal generator 210 may generate a new duty peak signal DP having the maximum value dpk that corresponds to the changed duty ratio.

The first on ramp signal ORP1 may be a periodic signal that starts linearly increasing in response to the rising edge of the first on signal ON1. The first through third on ramp signals ORP1, ORP2, and ORP3 are periodic signals that repeats linearly increasing in response to the rising edges of the first through third on signals ON1, ON2, and ON3, respectively, initializing in response to next rising edges, and linearly increasing again. The first through third on ramp signals ORP1, ORP2, and ORP3 may be generated in the same manner as the ramp signal RP based on the PWM signal.

The first on ramp signal ORP1 is compared with the maximum value dpk of the duty peak signal DP. When the first on ramp signal ORP1 is greater than the maximum value dpk of the duty peak signal DP, the first off signal OFF1 may be in a logic 'high' state. Accordingly, the first off signal OFF1 may have a rising edge at t4. t4, which is a point of time that first off signal OFF1 has a rising edge, is elapsed from t2, which is a point of time that the first on signal ON1 has a rising edge, by pulse duration of the PWM signal, that is, (t4-t2) that corresponds to (t3-t1). Also, the first off signal OFF1 transits from a logic 'high' state to a logic 'low' state at t6, which is a point of time that the first on ramp signal ORP1 has a falling edge. Then, the first off signal OFF1 has a rising edge again at t8 when time corresponding to pulse duration of the PWM signal is elapsed from t6.

The second on ramp signal ORP2 is compared with the maximum value dpk of the duty peak signal DP. When the second on ramp signal ORP2 is greater than the maximum value dpk of the duty peak signal DP, the second off signal OFF2 may be in a logic 'high' state at t5. t5 is elapsed from t3, which is a point of time that the second on signal ON2 has a rising edge, by (t5-t3) that corresponds to pulse duration of the PWM signal. Then, the second off signal OFF1 transits from a logic 'high' state to a logic 'low' state at t7, which is a point of time that the second on ramp signal ORP2 has a falling edge, and thus one period is completed.

The third on ramp signal ORP3 is compared with the maximum value dpk of the duty peak signal DP. When the third on ramp signal ORP3 is greater than the maximum value dpk of the duty peak signal DP, the third off signal OFF3 may have a rising edge at t6. t6 is elapsed from t4, which is a point of time that the third on signal ON3 has a rising edge, by (t6-t4) that corresponds to pulse duration of the PWM signal.

The first through third off signals OFF1, OFF2, and OFF3 have rising edges after pulse duration of the PWM signal is elapsed from the rising edges of the first through third on signals ON1, ON2, and ON3, respectively.

A first channel signal CH1 transits from a logic 'low' state to a logic 'high' state in response to the rising edge of the first on signal ON1 and transits from a logic 'high' state to a logic 'low' state in response to the rising edge of the first off signal OFF1. Accordingly, the first channel signal CH1 may correspond to a signal, which is a PWM signal delayed by a predetermined phase. For example, the first channel signal CH1 may correspond to a signal, which is a PWM signal delayed by (t2-t1) and may consequently correspond to a signal having a phase shifted by $\pi/2$.

A second channel signal CH2 transits from a logic 'low' state to a logic 'high' state in response to the rising edge of the second on signal ON2 and transits from a logic 'high' state to a logic 'low' state in response to the rising edge of the second off signal OFF2. The second channel signal CH2 may correspond to a signal, which is a PWM signal shifted by $\pi$.

A third channel signal CH3 transits from a logic 'low' state to a logic 'high' state in response to the rising edge of the third on signal ON3 and transits from a logic 'high' state to a logic 'low' state in response to the rising edge of the third off signal OFF3. The third channel signal CH3 may correspond to a signal, which is a PWM signal shifted by $3\pi/2$.

Accordingly, the phase shift circuit 10 according to the current embodiment of the inventive concept may generate a plurality of channel signals CH1, CH2, and CH3 having phases that are different from each other, based on only one PWM signal. Since any signals do not need to be input from the outside except for the PWM signal, the phase shift circuit 10 does not require additional pinout and thus may be simply realized.

Figure 6:
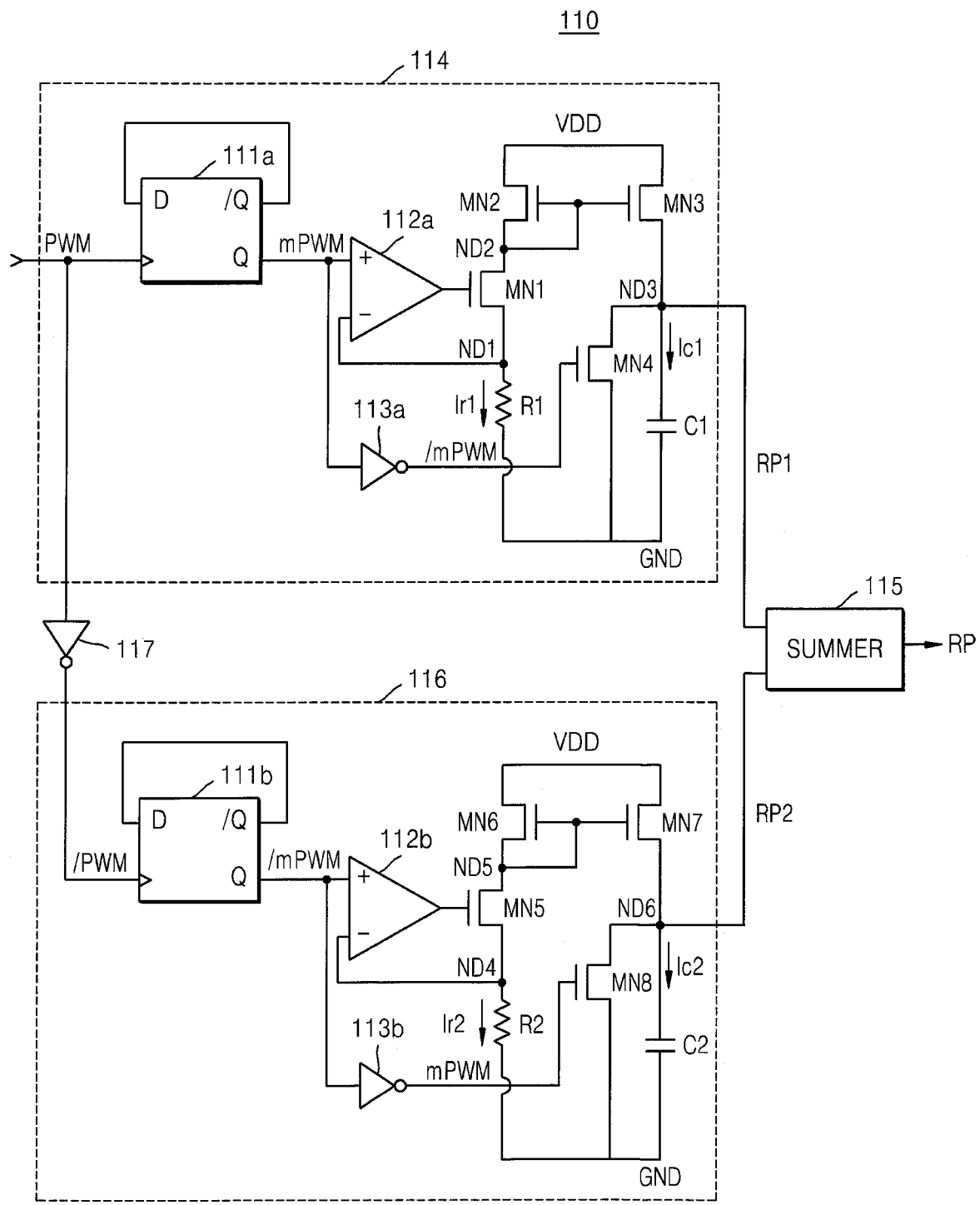
FIG. 6 is a circuit diagram of a ramp signal generator, according to an embodiment of the inventive concept.

FIG. 6 is a circuit diagram of the ramp signal generator 110, according to an embodiment of the inventive concept.

The ramp signal generator 110 may include a first ramp signal unit 114, a second ramp signal unit 116, and a summer 115.

The first ramp signal unit 114 receives a PWM signal and provides a first ramp signal RP1. The second ramp signal unit 116 receives a complementary PWM signal /PWM, which is an inverse signal of the PWM signal, and provides a second ramp signal RP2.

The summer 115 sums up the first ramp signal RP1 and the second ramp signal RP2 and provides a ramp signal RP.

The first ramp signal unit 114 may substantially have the same structure as the second ramp signal unit 116. Hereinafter, only the first ramp signal unit 114 will be described and a detailed description of the second ramp signal unit 116 that is substantially the same as the first ramp signal unit 114 will be omitted.

The first ramp signal unit 114 may include a first flip flop 111a and a first capacitor C1. According to an embodiment, the first ramp signal unit 114 may further include a first stabilization unit, a current mirror, and a discharge transistor.

The first flip flop 111a receives a PWM signal, is toggled in each period of the PWM signal, and thus, provides a transformed PWM signal mPWM. The transformed PWM signal mPWM may have a period that is twice longer than a period of the PWM signal, be inversed in each period of the PWM signal, and thus have a duty ratio of 50%.

A first amplifier 112a and a first transistor MN1 may constitute a first stabilization unit. The first amplifier 112a may include a non inverting terminal that receives the transformed PWM signal mPWM and an inverting terminal connected to a first node ND1. An output terminal of the first amplifier 112a may be connected to a gate of the first transistor MN1.

The first transistor MN1 may include a first terminal connected to the first node ND1 and a second terminal connected to a second node ND2.

The non inverting terminal and the inverting terminal of the first amplifier 112a are insulated from each other; however, have the same voltage level. Accordingly, the first node ND1 may substantially have the same voltage level with that of the transformed PWM signal mPWM.

When the transformed PWM signal mPWM transits from a logic 'low' state to a logic 'high' state, the first transistor MN1 is turned on and thereby, the first node ND1 and the second node ND2 are electrically short each other so that a voltage level of the first node ND1 increases. Since the first amplifier 112a and the first transistor MN1 constitute a feedback circuit, the voltage level of the first node ND1 may not increase compared with the transformed PWM signal mPWM. Accordingly, the voltage level of the first node ND1 is the same as a voltage level of the transformed PWM signal mPWM when the transformed PWM signal mPWM is in a logic 'high' state.

When the transformed PWM signal mPWM transits from a logic 'high' state to a logic 'low' state, the first transistor MN1 is turned off and thereby, the first node ND1 and second node ND2 are electrically opened. In this regard, the first node ND1 is floated and thus a voltage level of the first node ND1 decreases to a ground voltage GND. The voltage of the first node ND1 may be the same as a voltage level of the transformed PWM signal mPWM when the transformed PWM signal mPWM is in a logic 'low' state.

A first resistor R1 may be connected between the first node ND1 and a ground voltage GND. The voltage level of the first node ND1 is substantially the same as the transformed PWM signal mPWM and thus a current Ir1 flowing in the first resistor R1 may also have a waveform substantially the same as the transformed PWM signal mPWM.

A second transistor MN2 and a third transistor MN3 may constitute a current mirror. The second transistor MN2 may be connected between the second node ND2 and a source voltage VDD, and the third transistor MN3 may be connected between a third node ND3 and the source voltage VDD. A gate of the second transistor MN2 may be connected to the second node ND2 and thus have a diode-connected transistor structure, and a gate of the third transistor MN3 is connected to the gate of the second transistor MN2 and thus a current mirror structure may be formed. In the current embodiment of the present invention, the second transistor MN2 and the third transistor MN3 are illustrated as MOS transistors; however, the inventive concept is not limited thereto.

Accordingly, when the first transistor MN1 is turned on, a current Ic1 that corresponds to the current Ir1 flowing in the first transistor R1 may flow in the third node ND3. When the second transistor MN2 and the third transistor MN3 substantially have the same parameter, the current Ir1 flowing in the first transistor R1 may be substantially the same as the current Ic1 flowing in the third node ND3. Accordingly, the current Ic1 flowing in the third node ND3 may substantially have a waveform that is substantially the same as the transformed PWM signal mPWM.

The first capacitor C1 may be connected between the third node ND3 and the ground voltage GND. Also, a fourth transistor MN4 is connected to the first capacitor C1 in parallel and thus may be interposed between the third node ND3 and the ground voltage GND. The complementary transformed PWM signal /mPWM, which is an inverse signal of the PWM signal, is input to a gate of the fourth transistor MN4. The complementary transformed PWM signal /mPWM may be the PWM signal inverted by a first inverter 113a. The fourth transistor MN4 may function as a discharge transistor for discharging the first capacitor C1.

When the fourth transistor MN4 is turned off, the current Ic1 flowing in the third node ND3 is charged to the first capacitor C1. That is, while the transformed PWM signal mPWM is in a logic 'high' state, the fourth transistor MN4 is turned off and the current Ic1 has a regular value. As the regular current Ic1 is charged to the first capacitor C1, a voltage of both terminals of the first capacitor C1, that is, a voltage level of the third node ND3, linearly increases.

While the transformed PWM signal mPWM is in a logic 'low' state, the complementary transformed PWM signal /mPWM may be in a logic 'high' state and the fourth transistor MN4 is turned on. Accordingly, electric charges charged to the first capacitor C1 is instantaneously discharged through the fourth transistor MN4. Thus, a voltage level of the third node ND3 may be the same as the ground voltage GND.

Therefore, while the transformed PWM signal mPWM is in a logic 'high' state, the voltage level of the third node ND3 linearly increases, and while the transformed PWM signal mPWM is in a logic 'low' state, the voltage level of the third node ND3 may be the same as the ground voltage GND. The voltage level of the third node ND3 is provided to the summer 115 as the first ramp signal RP1.

Similarly, the second ramp signal unit 116 may include a second flip flop 111b and a second capacitor C2. According to an embodiment, the second ramp signal unit 116 may further include a second stabilization unit, a current mirror, and a discharge transistor.

The second flip flop 111b receives the complementary PWM signal /PWM, which is an inverse signal of the PWM signal by a third inverter 117, is toggled in each period of the complementary PWM signal /PWM, and provides a complementary transformed PWM signal /mPWM. Alternatively, the complementary transformed PWM signal /mPWM may be provided by the first inverter 113a of the first ramp signal unit 114.

A second amplifier 112b and a fifth transistor MN5 may constitute a second stabilization unit. The second amplifier 112b may include a non inverting terminal that receives the complementary transformed PWM signal /mPWM and an inverting terminal connected to a fourth node ND4. An output terminal of the second amplifier 112b may be connected to a gate of the fifth transistor MN5. The fifth transistor MN5 may be connected between the fourth node ND4 and a fifth node ND5. The fourth node ND4 may have a voltage level substantially the same as the complementary transformed PWM signal /mPWM due to the second stabilization unit.

A second resistor R2 may be connected between the fourth node ND4 and the ground voltage GND. The second resistor R2 may have the same resistance value as the first resistor R1. Since the voltage level of the second node is substantially the same as the complementary transformed PWM signal /mPWM, a current Ir2 flowing in the second resistor R2 may also have a waveform substantially the same as the complementary transformed PWM signal /mPWM.

A sixth transistor MN6 and a seventh transistor MN7 may constitute a current mirror. The sixth transistor MN6 may be connected between the fifth node ND5 and the source voltage VDD, and the seventh transistor MN7 may be connected between a sixth node ND6 and the source voltage VDD. Gates of the sixth transistor MN6 and the seventh transistor MN7 may be connected to the second node ND2. Thus, when the fifth transistor MN5 is turned on, a current Ic2 that corresponds to the current Ir2 flowing in the second resistor R2 may flow in the sixth node ND6. Accordingly, the current Ic2 flowing in the sixth node ND6 may have a waveform substantially the same as the complementary transformed PWM signal /mPWM.

The second capacitor C2 may be connected between the sixth node ND6 and the ground voltage GND. Also, an eighth transistor MN8 is connected to the second capacitor C2 in parallel and thus may be interposed between the sixth node ND6 and the ground voltage GND. The transformed PWM signal mPWM is input to a gate of the eighth transistor MN8. The transformed PWM signal mPWM may be the complementary transformed PWM signal /mPWM, which is provided by the second flip flop 111b, inverted by a second inverter 113a. Alternatively, the transformed PWM signal mPWM may be provided by the first flip flop 111a of the first ramp signal unit 114. The eighth transistor MN8 may function as a discharge transistor for discharging the second capacitor C2.

When the eighth transistor MN8 is turned off, the current Ic2 flowing in the sixth node ND6 is charged to the second capacitor C2. Also, when the eighth transistor MN8 is turned on, the second capacitor C2 is discharged. The second capacitor C2 may have the same capacitance as the first capacitor C1. Accordingly, while the complementary transformed PWM signal /mPWM is in a logic 'high' state, a voltage level of the sixth node ND6 linearly increases, and while the complementary transformed PWM signal /mPWM is in a logic 'low' state, the voltage level of the sixth node ND6 is the same as the ground voltage GND. The voltage level of the sixth node ND6 is provided to the summer 115 as the second ramp signal RP2.

The summer 115 sums up the first ramp signal RP1 and the second ramp signal RP2 and provides a ramp signal RP. While the transformed PWM signal mPWM is in a logic 'high' state, the first ramp signal RP1 linearly increases, and while the transformed PWM signal mPWM is in a logic 'low' state, the second ramp signal RP2 linearly increases. Thus, the ramp signal RP may have a waveform such as a sawtooth wave that repeats linearly increasing in each period of the PWM signal and decreasing to the ground voltage GND.

The summer 115 receives the first ramp signal RP1 and the second ramp signal RP2 and provides the ramp signal RP The duty ramp signal generator 211 of FIG. 4 may substantially have the same structure as the first or second ramp signal unit 114 or 116 except for the first or second flip flop 111a or 111b. That is, when the PWM signal is directly input to the non inverting terminal of the first amplifier 112a from the first ramp signal unit 114 without passing through the first flip flop 111a, a duty ramp signal DRP is generated from the third node ND3. As described above, while the PWM signal is in a logic 'high' state, the voltage level of the duty ramp signal DRP linearly increases, and while the PWM signal is in a logic 'low' state, the voltage level of the duty ramp signal DRP is the same as the ground voltage GND. A principle of generating the duty ramp signal DRP would have been obvious to one of ordinary skill in the art.

Figure 7:
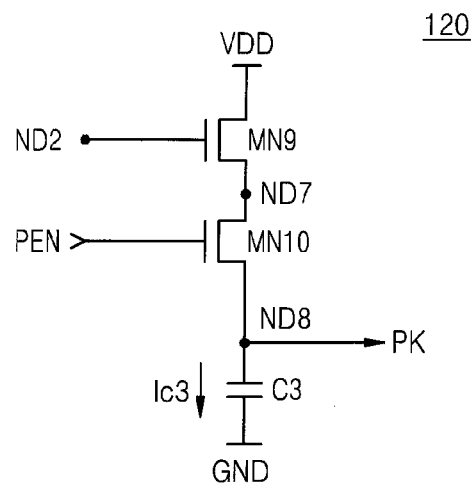
FIG. 7 is a circuit diagram of a peak signal generator, according to an embodiment of the inventive concept.

FIG. 7 is a circuit diagram of the peak signal generator 120, according to an embodiment of the inventive concept.

Referring to FIGS. 6 and 7, the peak signal generator 120 may include ninth and tenth transistors MN9 and MN10 and a third capacitor C3.

The ninth transistor MN9 is connected between the source voltage VDD and a seventh node ND7, and a gate of the ninth transistor MN9 is connected to the second node ND2. Thus, the ninth transistor MN9 and the second transistor MN2 may constitute a current mirror. Accordingly, when the first transistor MN1 is turned on, a current Ic3 that corresponds to the current Ir1 flowing in the first transistor R1 also flows in the seventh node ND7.

A tenth transistor MN10 is connected between the seventh node ND7 and an eighth node ND8. A peak enable signal PEN, which samples an initial period of the transformed PWM signal mPWM, is input to a gate of the tenth transistor MN10. The peak enable signal PEN is a signal that is in a logic 'high' state only during first one period of the PWM signal. Accordingly, the tenth transistor MN10 is only turned on during a first period of the PWM signal.

A third capacitor C3 is connected between the eighth node ND8 and the ground voltage GND. Since the tenth transistor MN10 is only turned on during a first period of the PWM signal, the current Ic3 is charged to the third capacitor C3 only during the first period of the PWM signal. The third capacitor C3 may have the same capacitance as the first capacitor C1. Accordingly, during the first period of the PWM signal, the current Ic3 substantially corresponds to the current Ic1 and consequently, an amount of electric charges charged to the third capacitor C3 may substantially correspond to an amount of electric charges charged to the first capacitor C1. However, the tenth transistor MN10 is turned off after the first period of the PWM signal and thus the third capacitor C3 is no more discharged or charged. Accordingly, an amount of electric charges that corresponds to the maximum amount of electric charges charged to the first capacitor C1 is charged and maintained in the third capacitor C3. That is, a voltage between both terminals of the third capacitor C3, that is, a voltage level of the eighth node ND8, is maintained in the maximum voltage level of the third node ND3. Accordingly, a peak signal PK is generated as a signal maintaining a peak value of the ramp signal RP.

Figure 8:
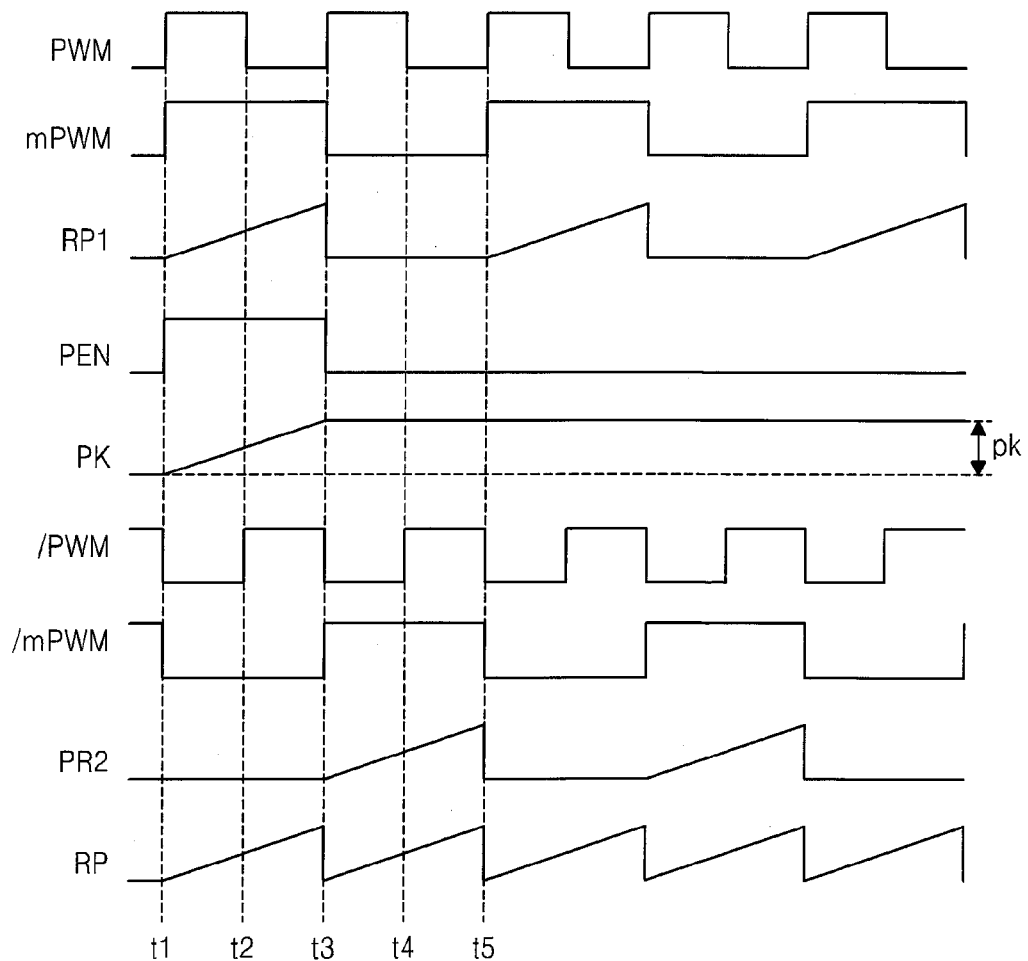
FIG. 8 shows waveforms for illustrating operations of a ramp signal generator and a peak signal generator, according to an embodiment of the inventive concept.

FIG. 8 shows waveforms for illustrating operations of the ramp signal generator 110 and the peak signal generator 120, according to an embodiment of the inventive concept.

Referring to FIG. 8, the PWM signal has a period from t1 to t3, the transformed PWM signal mPWM has a period from t1 to t5, and the transformed PWM signal mPWM is inverted each one period of the PWM signal.

The first ramp signal unit 114 may receive the PWM signal PWM and generate the transformed PWM signal mPWM by using the first flip flop 111a.

The first ramp signal RP1 linearly increases while the transformed PWM signal mPWM is enabled and may substantially have the same voltage level as the ground voltage GND while the transformed PWM signal mPWM is disabled.

The peak enable signal PEN which is sampled during an initial period of the transformed PWM signal mPWM is only enabled from t1 to t3. In this regard, the peak signal PK substantially has the same value as the first ramp signal RP1 from t1 to t3; however, maintains a regular peak value pk after t3.

The second ramp signal unit 116 may generate the second ramp signal RP2 based on the complementary transformed PWM signal /mPWM.

The first ramp signal RP1 may linearly increase while the complementary transformed PWM signal /mPWM is enabled, and the first ramp signal RP1 may substantially have the same voltage level as the ground voltage GND while the complementary transformed PWM signal /mPWM is disabled.

The first and second ramp signals RP1 and RP2 are summed up and the ramp signal RP may be generated. Since the first ramp signal RP1 and the second ramp signal RP2 have the voltage levels that are alternately and linearly increase, the ramp signal RP may have a waveform such as a sawtooth wave that repeats linearly increasing in each period of the PWM signal and decreasing to the ground voltage GND.

Figure 9:
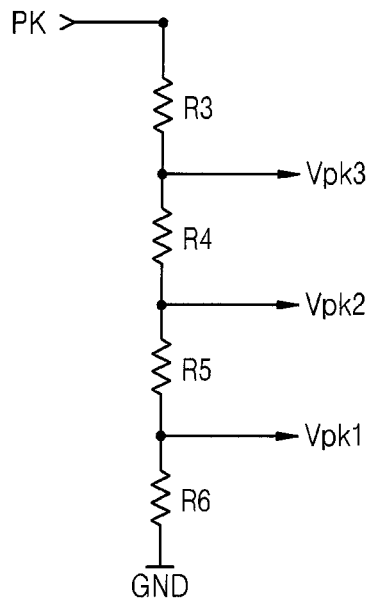
FIG. 9 is a circuit diagram illustrating a voltage divider, according to an embodiment of the inventive concept.

FIG. 9 is a circuit diagram illustrating the voltage divider 130a, according to an embodiment of the inventive concept.

Referring to FIG. 9, the voltage divider 130a may include third through sixth resistors R3, R4, R5, and R6 that are connected to each other in series. The peak signal PK may be input to one end of the third resistor R3, and one end of the sixth resistor R6 may be connected to the ground voltage GND. The peak signal PK is provided from the eighth node ND8 of the peak signal generator 120 of FIG. 7; however, the eighth node ND8 is not directly connected to one end of the third resistor R3. The voltage divider 130a illustrated in FIG. 9 is only an example, and the voltage divider is not limited thereto.

According to an embodiment of the inventive concept, the third through sixth resistors R3, R4, R5, and R6 may substantially have the same resistance values or different values, if necessary. For example, when the third through sixth resistors R3, R4, R5, and R6 substantially have the same values, the first peak signal Vpk1 provided from a node between the fifth resistor R5 and the sixth resistor R6 may have a voltage level (pk/4) that corresponds to ¼ of a size of the peak value pk. The second peak signal Vpk2 provided from a node between the fourth resistor R4 and the fifth resistor R5 may have a voltage level (pk/2) that corresponds to ½ of a size of the peak value pk. The third peak signal Vpk3 provided from a node between the third resistor R3 and the fourth resistor R4 may have a voltage level (3pk/4) that corresponds to ¾ of a size of the peak value pk.

Figure 10:
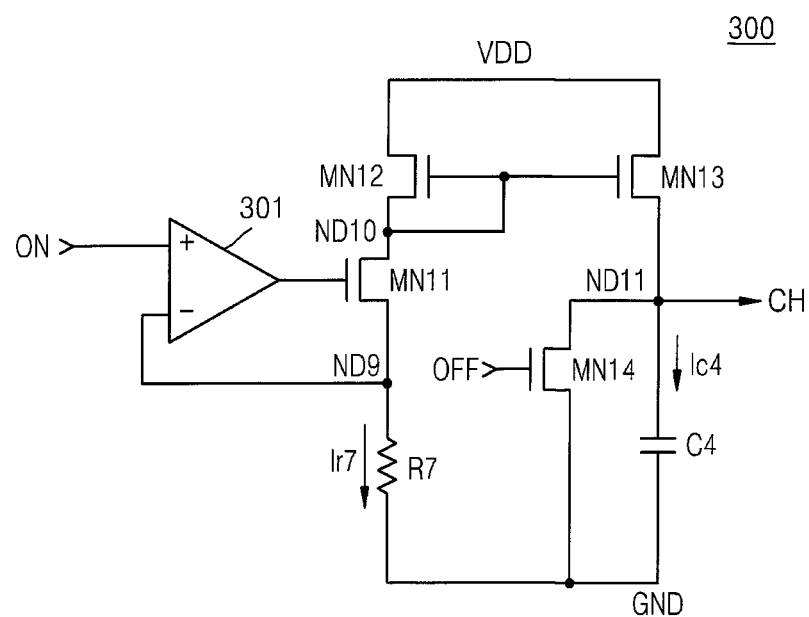
FIG. 10 is a circuit diagram of a channel signal generator, according to an embodiment of the inventive concept.

FIG. 10 is a circuit diagram of the channel signal generator 300, according to an embodiment of the inventive concept.

Referring to FIG. 10, the channel signal generator 300 may include a third amplifier 301, eleventh through fourteenth transistors MN11, MN12, MN13, and MN14, and a third capacitor C3.

The third amplifier 301 may include a non inverting terminal that receives an on signal ON and an inverting terminal connected to the ninth node ND9. The eleventh transistor MN11 may include a gate connected to an output terminal of the third amplifier 301, a first terminal connected to the ninth node ND9, and a second terminal connected to the tenth node ND10. A seventh resistor R7 may be connected between the ninth node ND9 and the ground voltage GND. As described with reference to FIG. 6, the voltage level of the ninth node ND9 may substantially the same as a waveform of the on signal ON. Also, a current Ir7 flowing in the seventh resistor R7 may substantially the same as a waveform of the on signal ON.

The twelfth transistor MN12 and the thirteenth transistor MN13 may constitute a current mirror. The twelfth transistor MN12 may include a first terminal connected to the tenth node ND10 and a second terminal connected to the source voltage VDD. The thirteenth transistor MN13 may include a first terminal connected to an eleventh node ND11 and a second terminal connected to the source voltage VDD. Gates of the twelfth transistor MN12 and the thirteenth transistor MN13 may be commonly connected to the tenth node ND10.

The fourteenth node ND14 and a fourth capacitor C4 that are connected to each other in parallel may be connected between the eleventh node ND11 and the ground voltage GND. The fourteenth node ND14 may function as a discharge transistor of the fourth capacitor C4. An off signal OFF may be input to a gate of the fourteenth node ND14. A capacitance of the fourth capacitor C4 may be significantly smaller than those of the first through third capacitors C1 through C3.

When the eleventh transistor MN11 is turned on by the current mirror, a current Ic4 that corresponds to the current Ir7 flowing in the seventh resistor R7 is charged to the fourth capacitor C4. Since the fourth capacitor C4 has a small capacitance, the fourth capacitor C4 is instantaneously charged at the maximum and thus a voltage level of the eleventh node ND11 may be a voltage dropped from the source voltage VDD by a source-drain voltage of the thirteenth transistor MN13. When the source-drain voltage of the thirteenth transistor MN13 is ignored, the source voltage VDD is output from the eleventh node ND11 as a channel signal CH. Even if the eleventh node ND11 is turned off, the fourth capacitor C4 is not discharged and thus the channel signal CH having the source voltage VDD may be maintained.

When the fourteenth node ND14 is turned on, that is, when an off signal OFF is enabled, the fourth capacitor C4 is instantaneously discharged and thus a voltage level of the channel signal CH may be the ground voltage GND. Even if the eleventh node ND11 is turned on, a current that corresponds to the current Ir7 is output by the current mirror; however, such a current flows to the ground through the fourteenth node ND14 and may not be charged to the fourth capacitor C4.

Accordingly, the channel signal generator 300 may provide the channel signal CH that is enabled in response to a rising edge of the on signal ON and is disabled in response to a rising edge of the off signal OFF.

Figure 11:
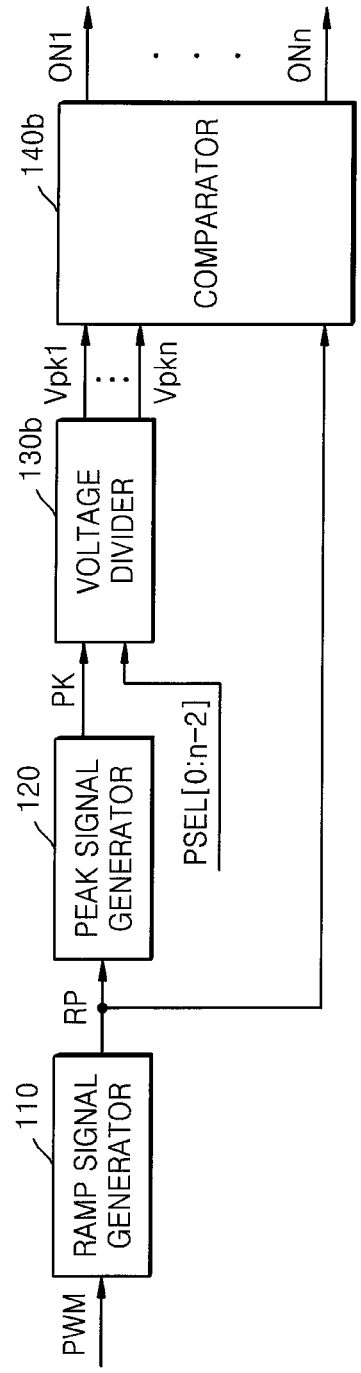
FIGS. 11 and 12 are block diagrams of on signal generators, according to embodiments of the inventive concept.

FIG. 11 is a block diagram of an on signal generator 100b, according to an embodiment of the inventive concept.

Comparing the on signal generator 100a of FIG. 2 with the on signal generator 100b of FIG. 11, the on signal generator 100b may include a voltage divider 130b that receives a phase selection signal PSEL[0:n−2]. For example, the phase selection signal PSEL[0:n−2] may correspond to a digital signal having a plurality of bits.

The ramp signal generator 110 generates the ramp signal RP that linearly increases in each period of the PWM signal. The ramp signal RP may be provided to the peak signal generator 120 and a comparator 140b.

The peak signal generator 120 generates the peak signal PK that maintains the peak value of the ramp signal RP based on the ramp signal RP.

The phase voltage divider 130b receives the peak signal PK and may provide a plurality of divided peak signals Vpk1, . . . , and Vpkn according to a selected ratio based on the phase selection signal PSEL[0:n−2]. As described above, a phase change may vary according to a division ratio of the plurality of divided peak signals Vpk1, . . . , and Vpkn so that a phase change may be set according to the phase selection signal PSEL[0:n−2], instead of a fixed phase change value. For example, the phase selection signal PSEL[0:n−2] may be provided from the outside or may be generated from a separate controller (not illustrated) included in the phase shift circuit 10.

The comparator 140b may compare the plurality of divided peak signals Vpk1, . . . , and Vpkn provided from the phase voltage divider 130b with the ramp signal RP and provide a plurality of on signals ON1, . . . , and ONn.

Figure 12:
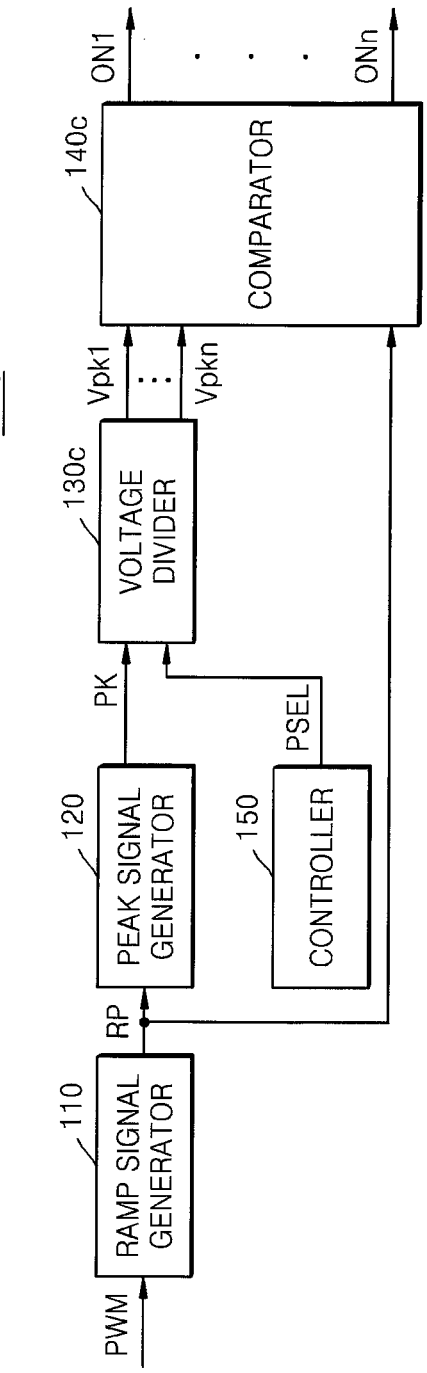

FIG. 12 is a block diagram of an on signal generator 100c, according to an embodiment of the inventive concept Comparing the on signal generator 100b of FIG. 11 with the on signal generator 100c of FIG. 12, the on signal generator 100c may further include a controller 150 that generates a phase selection signal PSEL. Detailed descriptions of elements that are the same as those of FIG. 11 will be omitted.

When channel signals having shifted phases that are different from each other according to an operation of the phase shift circuit 10 are to be generated, the controller 150 may generate the phase selection signal PSEL and provides the generated phase selection signal PSEL to the phase voltage divider 130b.

Figure 13:
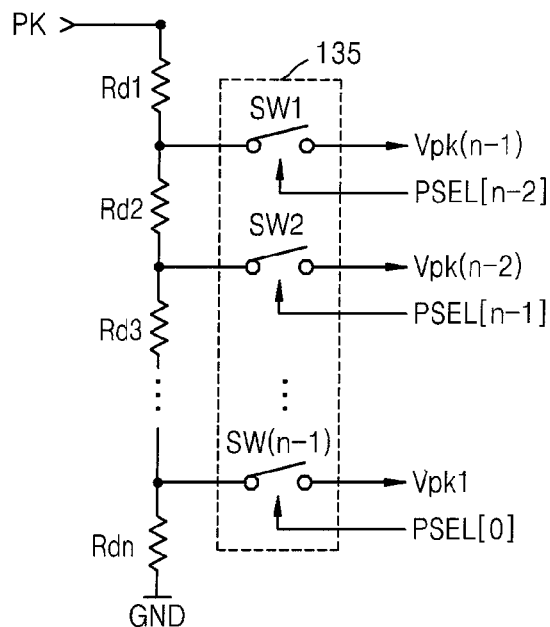
FIG. 13 is a circuit diagram of a voltage divider, according to an embodiment of the inventive concept.

FIG. 13 is a circuit diagram of the voltage divider 130b, according to an embodiment of the inventive concept.

Referring to FIG. 13, the phase voltage divider 130b may include a plurality of division resistors Rd1, Rd2, Rd3, . . . , and Rdn that are electrically connected to each other in series between the peak signal PK and the ground voltage GND. Also, the phase voltage divider 130b may include a plurality of switches SW1, SW2, . . . , and SW(n−1) that are connected to nodes between the division resistors Rd1, Rd2, Rd3, . . . , and Rdn that are connected to each other in series.

According to an embodiment of the inventive concept, the plurality of division resistors Rd1, Rd2, Rd3, . . . , and Rdn may substantially have the same values or values sequentially increased or decreased. Each bit of the phase selection signals PSEL may determine on/off operations of the plurality of switches SW1, SW2, . . . , and SW(n−1) based on values of the plurality of division resistors Rd1, Rd2, Rd3, . . . , and Rdn.

For example, when the plurality of division resistors Rd1, Rd2, Rd3, . . . , and Rdn substantially have the same values, each bit of the phase selection signals PSEL may have the same weight and may be used to adjust the values of the plurality of divided peak signals Vpk1, Vpk2, . . . , and Vpkn. That is, the first divided peak signal Vpk1 may correspond to a signal, which is the peak signal PK divided by n. When the plurality of division resistors Rd1, Rd2, Rd3, . . . , and Rdn have the different values, each bit of the phase selection signals PSEL may have different weights.

Figure 14:
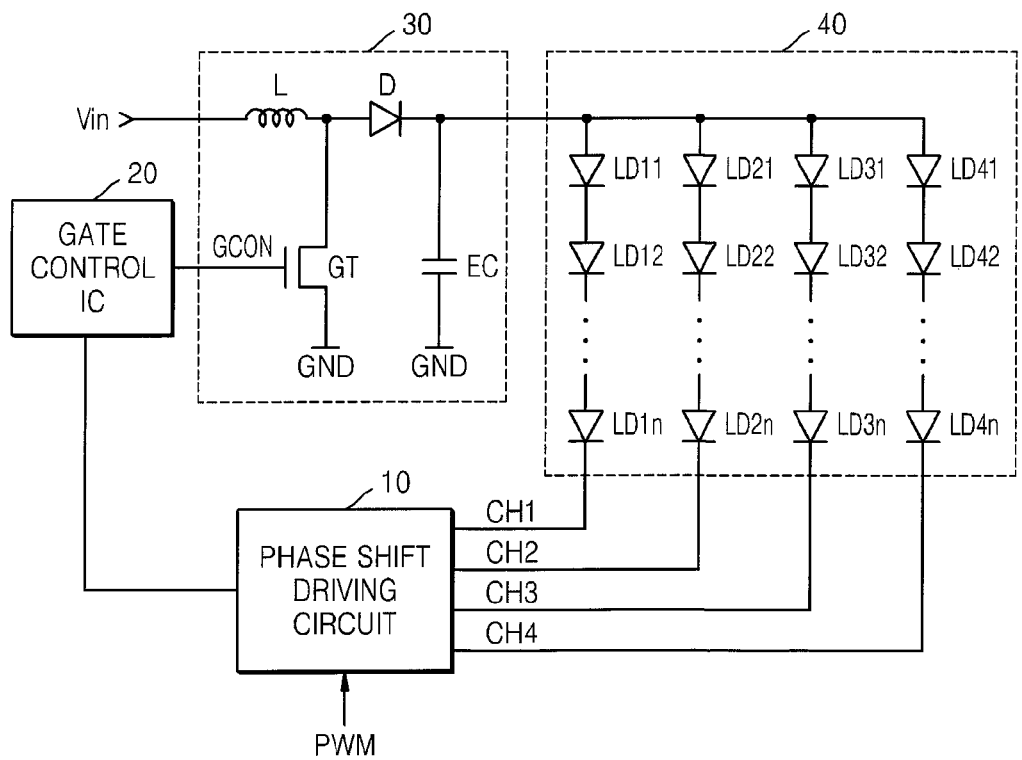
FIG. 14 illustrates a dimming circuit including a phase shift circuit, according to an embodiment of the inventive concept.

FIG. 14 illustrates a dimming circuit 1 including the phase shift circuit 10, according to an embodiment of the inventive concept.

Referring to FIG. 14, the dimming circuit 1 may include the phase shift circuit 10, a gate control integrated circuit (IC) 20, a driving signal provider 30, and a plurality of LED strings 40.

The phase shift circuit 10 may include elements described with reference to FIGS. 1 through FIG. 13 and may provide channel signals having phases that are different from each other based on the PWM signal.

The gate control IC 20 may provide a gate control signal GCON to a gate transistor GT included in the driving signal provider 30. The gate transistor GT is turned on in response to the gate control signal GCON so as to discharge input voltage Vin or is turned off to planarize the input voltage Vin through a driving capacitor EC, thereby providing the planarized input voltage to the plurality of LED strings 40.

The plurality of LED strings 40 may include first through fourth LED strings, and each of the first through fourth LED strings may be driven based on the input voltage Vin and corresponding channel signals CH1, CH2, CH3, and CH4.

According to an embodiment of the inventive concept, the LED strings are driven by varying an amount of current or by a PWM method. The dimming circuit including the phase shift circuit according to the present embodiment of the inventive concept may perform a dimming operation of the plurality of LED strings by applying the PWM signal with each different phase and may prevent a voltage drop and reduction in brightness of LEDs which may occur while the LED strings are driven at the same time, by varying their phases.

The phase shift circuit according to the inventive concept may simply provide a plurality of phase shifted PWM signals obtained by shifting a single standard PWM signal to each different phase. Accordingly, when the dimming circuit including the phase shift circuit according to the inventive concept is driven based on a PWM method, the PWM signals having phases that are different from each other may be provided to the plurality of LED strings and thus a stable operation is available.

According to embodiments, the phase shift circuit according to the inventive concept may be included in driving circuits using a dimming method.

The phase shift circuit and the dimming circuit including the phase shift circuit according to the embodiments of the inventive concept do not need a separate input terminal and may provide PWM signals having phases that are different from each other so that the phase shift circuit and the dimming circuit including the phase shift circuit may be formed to be small and may stably perform a dimming operation.

In addition, the phase shift circuit and the dimming circuit including the phase shift circuit according to the embodiments of the inventive concept may adaptively select a phase shift and thus may efficiently perform a dimming operation through a simple structure.

While the inventive concept has been particularly shown and described with reference to exemplary embodiments thereof, it will be understood that various changes in form and details may be made therein without departing from the spirit and scope of the following claims.

What is claimed is:

1. A phase shift circuit comprising:
    an on signal generator for generating a plurality of on signals having rising edges shifted by predetermined phases that are different from each other based on a pulse width modulation (PWM) signal;
    an off signal generator for generating a plurality of off signals having rising edges after pulse duration of the PWM signal is elapsed from a point of time when corresponding on signals have the rising edges based on the PWM signal and the corresponding on signals; and
    a channel signal generator for generating a plurality of channel signals that are enabled in response to the rising edges of the corresponding on signals and disabled in response to the rising edges of the off signals, wherein the on signal generator comprises:
    a first ramp signal generator for generating a ramp signal that linearly increases in each period of the PWM signal in response to the PWM signal; and
    a peak signal generator for generating a peak signal that maintains a peak value of the ramp signal based on the ramp signal.

2. The phase shift circuit of claim 1, wherein the on signal generator comprises:

a voltage divider for providing a divided peak signal by dividing the peak signal by a predetermined ratio; and
    a first comparator for generating at least one of the plurality of on signals by comparing the divided peak signal with the ramp signal.

3. The phase shift circuit of claim 2, wherein the first ramp signal generator comprises:
    a first ramp signal unit for generating a first ramp signal that linearly increases during an odd-numbered period of the PWM signal in response to the PWM signal;
    a second ramp signal unit for generating a second ramp signal that linearly increases during an even-numbered period of the PWM signal in response to the PWM signal; and
    a summer for providing the ramp signal by summing up the first ramp signal and the second ramp signal.

4. The phase shift circuit of claim 3, wherein the first ramp signal unit comprises:
    a first flip flop for providing a transformed PWM signal that is toggled in each period of the PWM signal; and
    a first capacitor, to which electric charges are charged based on the transformed PWM signal,
    wherein the first ramp signal unit provides a voltage between both terminals of the first capacitor as the first ramp signal.

5. The phase shift circuit of claim 4, wherein the first ramp signal unit further comprises a discharge transistor that discharges electric charges charged to the first capacitor in response to a complementary transformed PWM signal, which is an inverse signal of the transformed PWM signal.

6. The phase shift circuit of claim 4, wherein the first ramp signal unit further comprises:
    a first amplifier comprising a non inverting terminal, to which the transformed PWM signal is input, and an inverting terminal connected to a first node; and
    a first resistor connected between the first node and a ground voltage, wherein a current that corresponds to a current flowing in the first resistor is charged to the first capacitor.

7. The phase shift circuit of claim 6, wherein the peak signal generator comprises:
    a third capacitor, to which electric charges are charged based on the transformed PWM signal; and
    a first transistor connected to the third capacitor in series that allows electric charges to be charged in the third capacitor in response to a peak enable signal, which samples an initial period of the transformed PWM signal,
    wherein the peak signal generator provides a voltage of both terminals of the third capacitor as the peak signal.

8. The phase shift circuit of claim 7, wherein the third capacitor of the peak signal generator is charged by a current that corresponds to the current flowing in the first resistor.

9. The phase shift circuit of claim 1, wherein the off signal generator comprises:
    a duty signal generator for generating a duty peak signal having a value that is in proportion to a duty ratio of the PWM signal;
    a second ramp signal generator for generating an on ramp signal based on at least one of the plurality of on signals; and
    a second comparator for generating at least one of the plurality of off signals by comparing the on ramp signal with the duty peak signal.

10. The phase shift circuit of claim 9, wherein the duty signal generator comprises:

a duty ramp signal generator for generating a duty ramp signal that linearly increases while the PWM signal is in a logic 'high' state; and a duty peak signal generator for generating the duty peak signal that maintains a peak value of the duty ramp signal based on the duty ramp signal.

11. The phase shift circuit of claim 1, wherein the channel signal generator comprises a channel capacitor that is charged in response to the plurality of on signals and discharged in response to at least one of the plurality of off signals, and provides a voltage of both terminals of the channel capacitor as at least one of the plurality of channel signals.

12. A phase shift circuit comprising:

an on signal generator for generating a plurality of on signals having rising edges shifted by selected phases that are different from each other based on a pulse width modulation (PWM) signal;

an off signal generator for generating a plurality of off signals having rising edges after pulse duration of the PWM signal is elapsed from a point of time when corresponding on signals have the rising edges based on the PWM signal and the corresponding on signals; and a channel signal generator for generating a plurality of channel signals that are enabled in response to the rising edges of the corresponding on signals and disabled in response to the rising edges of corresponding off signals, wherein the plurality of channel signals are coupled to drive corresponding strings of light emitting diodes (LEDs), wherein the on signal generator comprises:

a ramp signal generator for generating a ramp signal that linearly increases in a period of the PWM signal in response to the PWM signal; and a peak signal generator for generating a peak signal that maintains a peak value of the ramp signal based on the ramp signal.

13. The phase shift circuit of claim 12, wherein the on signal generator comprises:

a voltage divider for providing at least one divided peak signal by dividing the peak signal based on a phase selection signal for selecting the phases; and a comparator for generating the at least one on signal by comparing the at least one divided peak signal with the ramp signal.

14. The phase shift circuit of claim 13, wherein the on signal generator further comprises a controller that generates the phase selection signal.

15. The phase shift circuit of claim 13, wherein the voltage divider comprises:

a plurality of division resistors connected in series between a node, to which the peak signal is applied, and a ground voltage; and at least one switch comprising one end connected to at least one node between the plurality of division resistors and the other end for providing the divided peak signal, when the at least one switch is turned on in response to the phase selection signal.

16. The phase shift circuit of claim 15, wherein a ratio of the divided peak signal to the peak signal is in proportion to the selected phases.

17. A dimming circuit comprising:

a phase shift circuit for providing a plurality of channel signals having phases different from each other based on a pulse width modulation (PWM) signal;

a gate control integrated circuit (IC) electrically connected to the phase shift circuit, for generating a gate control signal;

a driver for providing an input voltage in response to the gate control signal; and a plurality of light emitting diode (LED) strings driven based on the input voltage and the plurality of channel signals;

wherein the phase shift circuit comprises:

an on signal generator for generating a plurality of on signals having rising edges shifted by the phases that are different from each other based on the PWM signal;

an off signal generator for generating a plurality of off signals having rising edges after pulse duration of the PWM signal is elapsed from a point of time when the corresponding on signals have the rising edges, based on the PWM signal and the corresponding on signals; and a channel signal generator for generating a plurality of channel signals that are each enabled in response to the rising edges of the corresponding on signals and disabled in response to the rising edges of the corresponding off signals, wherein the on signal generator comprises:

a first ramp signal generator for generating a ramp signal that linearly increases in each period of the PWM signal in response to the PWM signal; and a peak signal generator for generating a peak signal that maintains a peak value of the ramp signal based on the ramp signal.

18. The dimming circuit of claim 17, wherein the driver comprises:

a gate transistor for grounding the input voltage in response to the gate control signal; and a capacitor for planarizing the input voltage and providing the planarized input voltage to one end of the plurality of LED strings.

19. The dimming circuit of claim 17, wherein each of the plurality of LED strings comprises a switch that is turned on in response to the channel signal.

* * * * *

UNITED STATES PATENT AND TRADEMARK OFFICE
CERTIFICATE OF CORRECTION

PATENT NO. : 9,781,790 B2
APPLICATION NO. : 13/234656
DATED : October 3, 2017
INVENTOR(S) : Youn-woong Chung Page 1 of 1

It is certified that error appears in the above-identified patent and that said Letters Patent is hereby corrected as shown below:

In the Claims

On Column 21, Line 34, after "a", insert -- first -- (1st occurrence)

On Column 21, Line 35, between "in" and "period", replace "a" with -- each --

On Column 21, Lines 40-47, Claim 13 should read:
-- 13. The phase shift circuit of claim 12, wherein the on signal generator comprises:
  a voltage divider for providing a divided peak signal by dividing the peak signal by a predetermined ratio; and
  a first comparator for generating at least one of the plurality of on signals by comparing the divided peak signal with the ramp signal. --

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*